Nov. 21, 1933.  W. L. NEU ET AL  1,936,203
VENTILATED BUFF
Filed Nov. 14, 1932  3 Sheets-Sheet 1
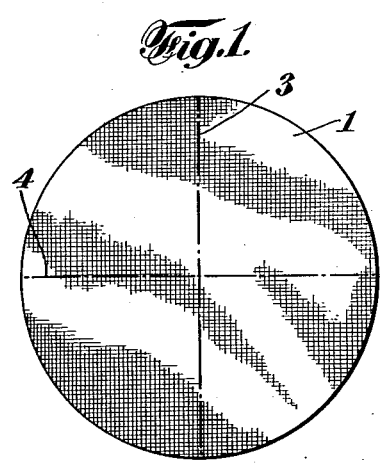
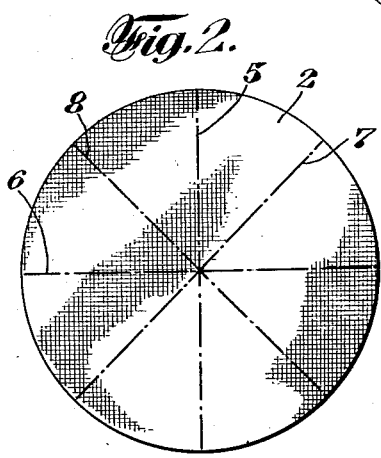
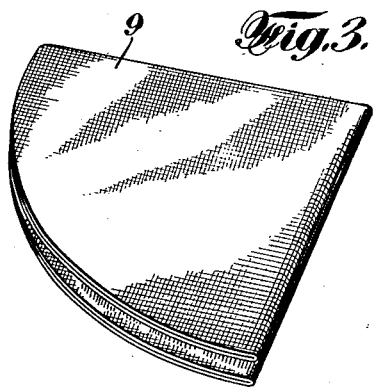
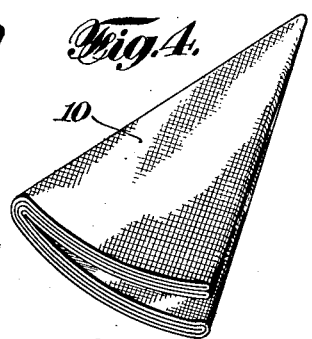
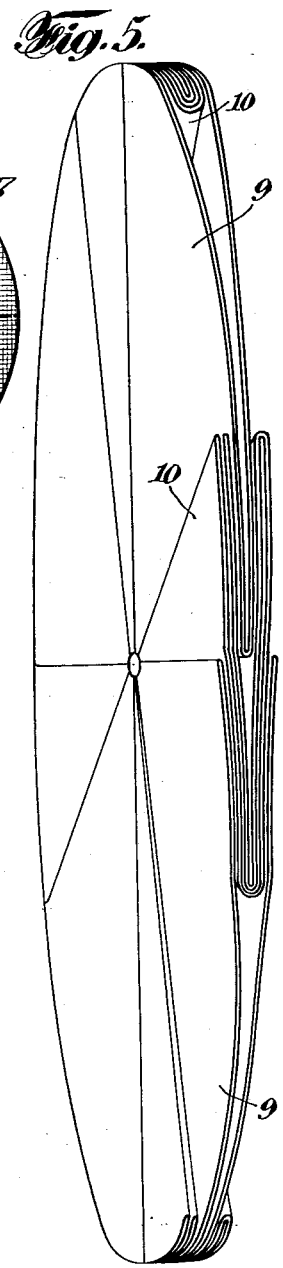
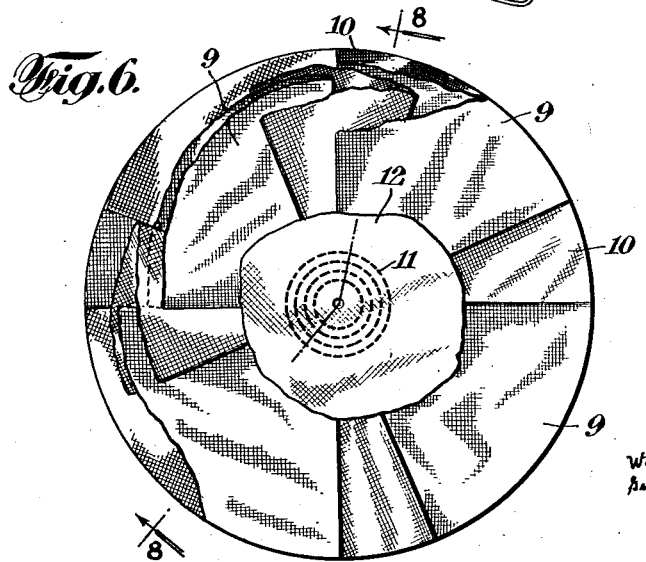
INVENTORS
Warren L. Neu, and
Guy A. Cheney
BY
Knight Bros
ATTORNEYS Nov. 21, 1933.                W. L. NEU ET AL                      1,936,203
                                VENTILATED BUFF
                         Filed Nov. 14, 1932          3 Sheets-Sheet 2
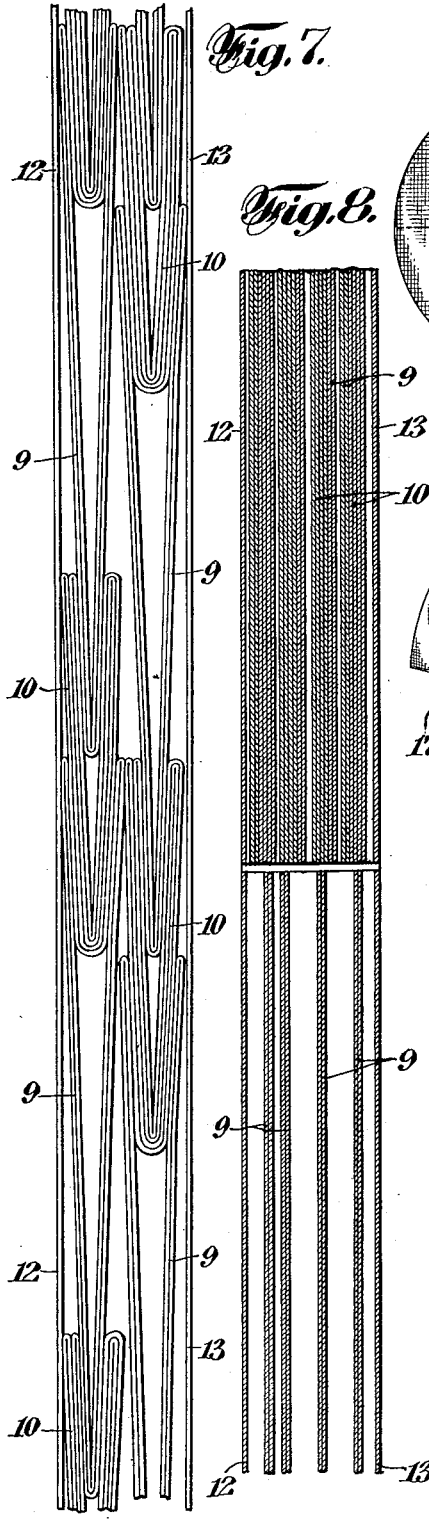
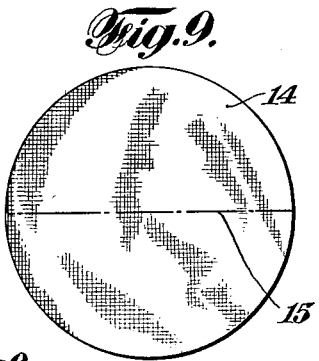
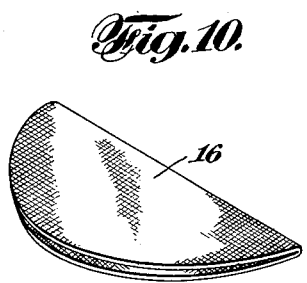
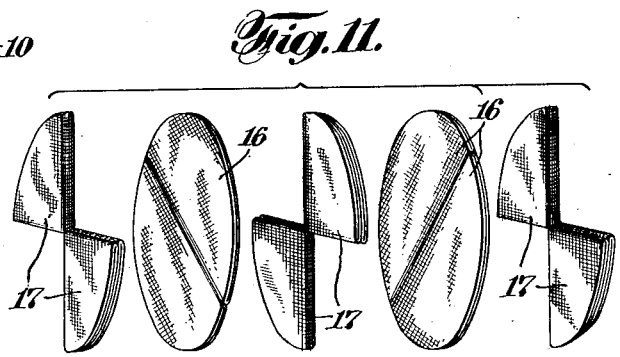
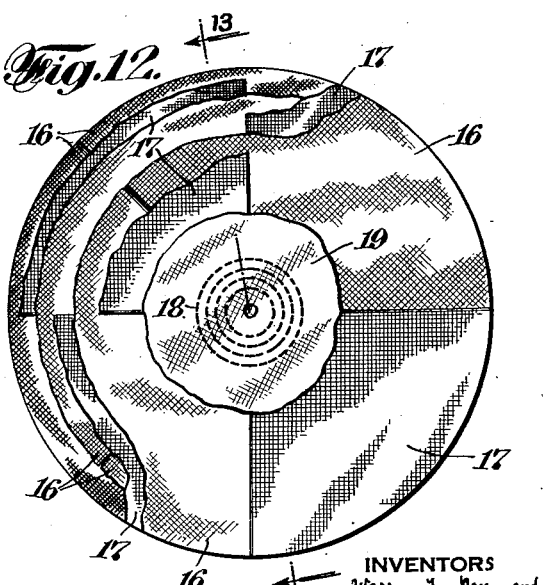
INVENTORS
Warren L. Neu, and
Guy A. Choney
BY
Knight Bros
ATTORNEYS Nov. 21, 1933.  W. L. NEU ET AL  1,936,203
VENTILATED BUFF
Filed Nov. 14, 1932   3 Sheets-Sheet 3
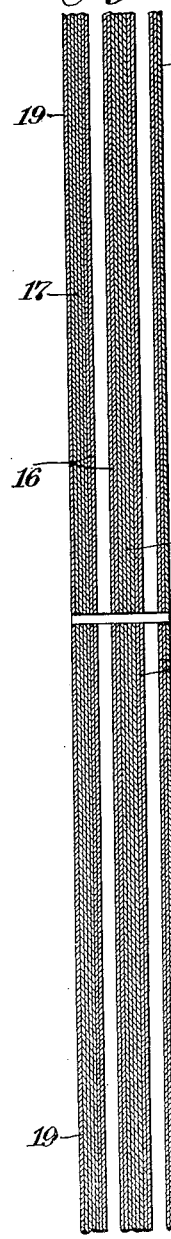
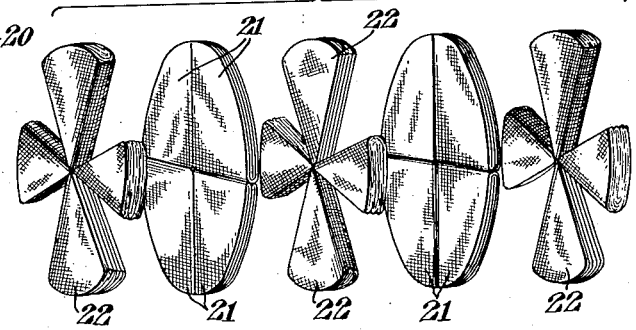
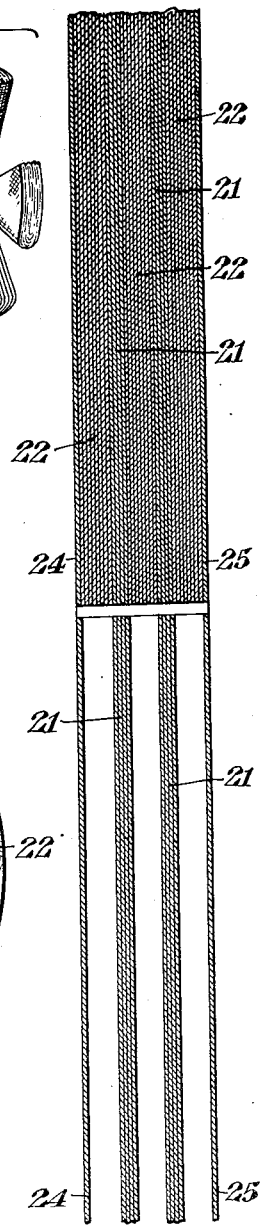
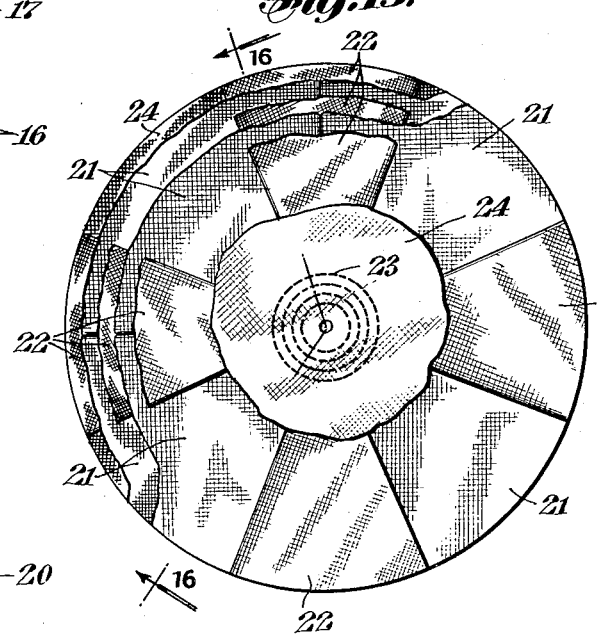

Patented Nov. 21, 1933

1,936,203

UNITED STATES PATENT OFFICE 1,936,203

VENTILATED BUFF

Warren L. Neu and Guy A. Cheney, Anderson, Ind., assignors to Hanson-Van Winkle-Munning Company, Matawan, N. J., a corporation of New Jersey Application November 14, 1932
Serial No. 642,476

7 Claims. (Cl. 51—193)

This invention relates to buffs as used for polishing and buffing metals and other materials.

Such buffs are commonly made of superposed plies of woven fabric such as muslin, cotton duck, canvas or the like, and by reason of the material of which they are constructed, they are frequently subject to taking fire from the heat developed by the friction incidental to their use. This difficulty is of particularly frequent occurrence where buffs are used on what might be called a "heavy duty" work in automatic polishing and buffing machinery. Its tendency to occur places a limitation upon the speed with which a given job may be performed.

In the construction of buffs for "heavy duty" buffing, various types of folded full disks have been employed by reason of their greater cutting power and durability. The frictional heat developed in their use is especially severe, and firing has accordingly been especially prevalent in plants where it has been sought to utilize their superior cutting power to the fullest extent possible.

Our invention has for an important object to provide a principle of construction by which folded disk buffs may be made less subject to the tendency to firing under severe operating conditions. This principle of construction involves the provision of ventilation spaces within the body of the buff, so that heat can be more readily dissipated or carried away, and thus the rise in temperature to the point of taking fire be avoided. Such ventilation spaces are in accordance with our invention provided by the employment of a plurality of kinds of cloth units so associated as to produce radial air spaces which are open at the periphery, while at the same time definitely maintaining the uniform balance of the buff about the center. These air spaces are formed as intervening gaps or voids between buff segments of folded cloth by assembling such segments radially about a common center, with the radial gaps intervening between them but bridged by buff units of greater included angle than the segments aforesaid. The simplest, though perhaps the least effective, form of such construction would be represented by spaced apart folded segments between unfolded full disks of cloth. We prefer, however, to employ segments of different included angles, and we have accordingly illustrated the invention in the accompanying drawings as comprising smaller and larger segments associated together in such a way that the larger segments bridge radial air spaces between smaller segments.

In said drawings—

Figures 1 and 2 are face views of two cloth disks with folding lines indicated for the production of 90° and 45° segments respectively.

Figures 3 and 4 are perspective views of the two types of segments mentioned.

Figure 5 is a perspective view of a complete circular unit of the 45° and 90° segments, assembled in accordance with our invention, a plurality of such circular units being assembled to produce a buff section.

Figure 6 is a face view of a buff section assembled from circular units such as shown in Figure 5, parts being broken away to show the relation of the two types of segments employed.

Figure 7 is a developed edge view of two associated circular units showing a preferred arrangement of the units with respect to each other.

Figure 8 is a fragmentary, vertical section on the line 8—8 of Figure 6.

Figure 9 is a face view of a full disk of cloth with folding line indicated for producing a segment of 180°.

Figure 10 is a perspective view of a segment thus folded.

Figure 11 is a diagrammatic view of successive layers of 90° segments and 180° segments, illustrating the positional relationship of the segments when assembled to form a section.

Figure 12 is a face view of a buff section made up of segments, illustrated in Figures 9, 10 and 11, parts being broken away to show the relation of the two types of segments relatively to each other.

Figure 13 is a fragmentary section on the section line 13—13 of Figure 12.

Figure 14 is a diagrammatic view of a plurality of layers of 90° segments and 45° segments, showing an optional disposition of these types of segments with respect to each other in the formation of a buff section.

Figure 15 is a face view of a buff section assembled from segments, as indicated in Figure 14, parts being broken away to show the relative positions of the two types of segments.

Figure 16 is a sectional view on the section line 16—16 of Figure 15.

Referring in detail to the embodiment of the invention illustrated in Figures 1 to 8 of the drawings, the two kinds of segments are illustrated as full disks of cloth, 1 and 2 respectively, those which are to be folded into 90° segments, as illustrated in Figure 3, being folded on the lines 3, 4 which run parallel to the warp and weft threads respectively, whereas those which are to be folded into 45° segments, as illustrated in Figure 4 being folded on the lines 5, 6, which run parallel to the warp and weft threads respectively, and on the lines 7 and 8 which are at 45° to the warp and weft threads. The resulting segments 9 and 10, illustrated in Figures 3 and 4 respectively, thus both have folds parallel to the warp and weft threads, and that illustrated in Figure 4 has an additional fold across the bias. While the invention is not limited to the location of the folds in the particular relation to the warp and weft threads described, this particular relation does offer a greater durability and a faster cutting quality, and hence is preferred. A construction which has been found particularly practical is one in which a circular buff unit, as shown in Figure 5, comprises four equally spaced 45° segments 10 interleaved with four 90° segments 9, which latter thus bridge the gap or air space between successive 45° segments 10, as previously explained. A buff section may comprise, for example, two or more of the circular buff units illustrated in Figure 5, preferably arranged in staggered relation with respect to the location of the two kinds of segments, as shown in the developed edge view, Figure 7, and stitched together at 11 between unfolded facing disks 12 and 13. By reference to Figure 6, the general arrangement of the assembled units will be readily understood, and by reference to Figures 7 and 8, the principle by which the ventilation spaces are provided will be evident. The illustration of stitching in Figure 6 represents, of course, only one of many types of stitching which may be employed in assembling the units into sections.

In the embodiment illustrated in Figures 9 to 13 of the drawings, the two types of segments are 90° and 180° respectively. The 180° segments may be produced by folding a full disk 14 on the diametric line 15 into a segment 16, as illustrated in Figure 10. A number of these 180° segments 16 with intervening 90° segments 17 (produced as already described), are assembled in, for example, the order or arrangement shown diagrammatically in Figure 11. The 90° segments 17 of one layer are preferably staggered with respect to the next layer of 90° segments, and if desired the positions of their radial folds may be reversed in the successive layers, although this is optional. The 180° segments intervening between the 90° segments are so placed that their adjacent diametric folds are overlapped by the 90° segments of one layer, and hence the gaps or ventilation spaces between the 90° segments of that layer are continuously bridged by uninterrupted arcs of at least one pair of 180° segments. A number of these units are stitched together by lines of stitching 18 between facing disks 19, 20 into the form of a section, to produce a section, as illustrated in Figures 12 and 13.

A symmetric arrangement of 90° segments 21 and 45° segments 22 is illustrated diagrammatically in Figure 14 and assembled, in accordance with our invention, into a section by stitching 23 between facing disks 24, 25, as illustrated in Figures 15 and 16. In this instance the 45° segments overlap each other, and the ventilation spaces between the 45° segments are continuously bridged by uninterrupted arcs of the adjacent 90° segments.

In all embodiments of the invention balance is, of course, essential. The various parts must, therefore, be uniformly distributed around the center. It is also desirable that the periphery of the assembled segment should not be interrupted across its entire face at any one radial plane, and that the segments be so arranged as to support and cooperate with each other in the maintenance of their proper positions and in the performance of their work. A buff constructed as described not only operates with a high cutting speed and much lower firing tendency than the ordinary types of folded disk buffs, but it shows good durability under heavy usage, and remains in good balance in use.

The embodiments illustrated will indicate the principle underlying the invention, and will enable those skilled in the art to construct these and other forms of the invention than those specifically shown and described.

We claim:—

1. A buff comprising a plurality of segments of smaller arcuate extent radially disposed in spaced apart relation about a common center, and a plurality of segments of greater arcuate extent radially disposed in positions overlapping said segments of smaller arcuate extent and bridging the spaces between them.

2. A buff comprising two series of fabric disks folded into segments of a circle, the segments of one series of greater arcuate extent than those of the other, the segments of smaller arcuate extent being circumferentially spaced apart in radial positions about a common center, and the segments of greater arcuate extent being radially disposed in positions bridging the radial spaces between the segments of smaller arcuate extent and providing therewith a continuity of peripheral surface throughout the circumference of the circle.

3. A buff comprising a series of larger segments and a series of smaller segments, the segments of the two series being of substantially equal radius and alternately disposed with respect to each other in overlapping radial positions about a common center.

4. A buff comprising two series of fabric disks of substantially equal radius and folded respectively into larger and smaller segments, the segments of the two series being alternately disposed in interleaved relation about a common center, with air spaces between the successive smaller segments.

5. A buff comprising a series of smaller segments uniformly spaced apart circumferentially about a common center, and a series of larger segments uniformly disposed circumferentially about the same center and bridging the radial spaces between the smaller segments.

6. A circular buff unit comprising circumferentially alternating segments at 90° and 45° respectively, the segments of 45° being overlapped by those of 90°, but circumferentially spaced from each other.

7. A buff section comprising a plurality of superposed circular units circumferentially staggered with respect to each other, each of said circular units comprising a series of segments of smaller arcuate extent radially disposed in circumferentially uniform spaced apart relation, and a series of segments of greater arcuate extent circumferentially bridging the spaces between the segments of smaller arcuate extent.

WARREN L. NEU.
GUY A. CHENEY.